(12) United States Patent
Dowling et al.

(10) Patent No.: US 8,448,054 B2
(45) Date of Patent: May 21, 2013

(54) SIGNAL MAPPER FOR REDUCING ERROR COEFFICIENT

(76) Inventors: Eric Morgan Dowling, Escazu (CR); John Fonseka, Plano, TX (US)

( * ) Notice: Subject to any disclaimer, the term of this patent is extended or adjusted under 35 U.S.C. 154(b) by 876 days.

(21) Appl. No.: 12/385,469

(22) Filed: Apr. 9, 2009

(65) Prior Publication Data

US 2010/0262896 A1 Oct. 14, 2010

(51) Int. Cl.
*H03M 13/00* (2006.01)

(52) U.S. Cl.
USPC ............................. 714/794; 714/795; 375/341

(58) Field of Classification Search
USPC .................. 714/792, 794, 795, 796; 375/341
See application file for complete search history.

(56) References Cited

U.S. PATENT DOCUMENTS

| 5,142,551 | A  | * | 8/1992 | Borth et al. | 375/219 |
|---|---|---|---|---|---|
| 6,195,396 | B1 | * | 2/2001 | Fang et al. | 375/261 |
| 6,445,755 | B1 | * | 9/2002 | Chung et al. | 375/341 |
| 6,594,795 | B1 | * | 7/2003 | Satou | 714/795 |
| 7,372,916 | B2 | * | 5/2008 | Pappalardo et al. | 375/295 |
| 2008/0069273 | A1 | * | 3/2008 | Geller et al. | 375/341 |

* cited by examiner

*Primary Examiner* — Joshua Lohn
(74) *Attorney, Agent, or Firm* — Eric M. Dowling

(57) ABSTRACT

An improved mapping policy, signal mapper, transmitter, receiver, and communication system are introduced. The improved signal mapping policy alternates between standard and inverted bit mapping functions at selected phase states to reduce the error coefficient of MSK and other types of CPFSK signals. The proposed policy can more generally be applied to other types of signals with memory as well. Simulations show that the mapping policy can significantly improve performance particularly at lower to moderate SNR values.

20 Claims, 7 Drawing Sheets

SIGNAL MAPPER FOR REDUCING ERROR COEFFICIENT

BACKGROUND OF THE INVENTION

1. Field of the Invention

This invention relates generally to communication transmitters, receivers, and systems. More particularly, the invention relates an improved signal mapping technique for use with communications signals that have inherent memory.

2. Description of the Related Art

It is known that the event error probability, $P_E$, and the bit error probability, $P_B$, of continuous phase frequency shift keying (CPFSK) signals, over an additive white Gaussian noise (AWGN) channel with two-sided power spectral density, $N_0/2$, can be approximately expressed at high signal to noise ratio (SNR) as:

$$P_E = k_E Q\left(\sqrt{\frac{d_{min}^2 E_b}{N_0}}\right); \quad (1)$$

$$P_B = k_B Q\left(\sqrt{\frac{d_{min}^2 E_b}{N_0}}\right)$$

where, $d_{min}$ is the normalized minimum distance, $E_b$ is the bit energy, $k_E$ is the event error coefficient, $k_B$ is the bit error coefficient, and $Q(\circ)$ is the standard Q-function. For further background information related to the above, the reader is referred to the references below.

[1] SUNDBERG, C. E.: 'Continuous phase modulation', IEEE Communications Magazine, 1986, (24), pp. 25-38
[2] ANDERSON, J. B.: '*Digital Transmission Engineering*' (IEEE Press, 1998)
[3] PROAKIS, J. G.: '*Digital Communications*', Fifth Edition (Mc-Graw-Hill, 2008)
[4] FONSEKA, J. P., DOWLING, E. M. and TENG, C. C.: 'Quadrature multiplexed CPM', IEEE Trans., 2008, COM-56, pp. 1487-1497. (see also US Patent Application 2007/0092018A1).
[5] S. Pizzi and S. G. Wilson, "Convolutional coding combined with continuous phase modulation", IEEE Trans. on Commun., COM-33, pp. 20-29, January 1985.

In [1-3], equation (1) was derived starting with an upper-bound obtained from a union bound that considers all merging events. The union bound is then approximated as a sum of contributions from merging events with the minimum Euclidean distance. This approximation is justified at higher SNR values because the contributions from merging events with larger distances are negligible at higher SNR. Hence, an event error probability, i.e. the probability of selecting an incorrect survival path during Viterbi decoding, $P_E$, can be written as in (1) with $k_E$ representing the total number of merging events with minimum distance. The bit error probability, $P_B$, can then be calculated from $P_E$ by considering the conditional probability, $P_{B|E}$, of a bit error conditioned on an event error. Hence, it follows from equation (1) that $k_B = k_E P_{B|E}$.

FIG. 1 shows a phase tree and a state transition logic diagram of minimum shift keying (MSK). MSK has a modulation index of h=0.5, and a squared normalized minimum distance of $d_{min}^2 = 2.0$ [1]. In FIG. 1a, there is one regular merging event that occurs at point A with minimum distance. Since the phase $\pi = -\pi$, the points B and C merge and represent a special merging event [1] that also has the minimum distance. Hence, MSK signals have two merging events (A and special merging event [B,C]) with minimum distance, and thus $k_E = 2$. When an event error associated with either of these merging events occurs, the bits of intervals T and 2T are both decoded incorrectly, and hence, the conditional probability is $P_{B|E} = 1$. Therefore, for regular MSK signals, $k_E = k_B = 2$.

As can be seen from FIG. 1a and FIG. 1b, in ordinary MSK, only two of the four phase states can be occupied during any given interval. Specifically, phase states 0 and $\pi$ can be occupied during each odd interval while phase states $\pi/2$ and $3\pi/2$ can be occupied during each even interval. For this reason, MSK behaves like a two state scheme [1-3]. This two-state structure is also present in the improved mapping policy discussed below.

It would be desirable to have an improved mapping policy that could reduce the bit error coefficient, $k_B$, of MSK, CPFSK and other modulation signals with inherent memory. It would be desirable if the improved mapping policy could significantly improve bit error rate performance particularly at lower to moderate SNR values.

SUMMARY OF THE INVENTION

An improved mapping policy, signal mapper, transmitter, receiver, and communication system are introduced. The improved signal mapping policy alternates between standard and inverted bit mapping functions at selected phase states to reduce the error coefficient of MSK and other types of CPFSK signals. The proposed policy can be applied to other modulation schemes with memory (coded or uncoded) in order to reduce the Hamming distance between trellis paths that determine the minimum Euclidian distance between signals in order to improve performance.

A first embodiment of the present invention involves a communication transmitter apparatus. The transmitter receives an input bit sequence and uses a state tracker. The state tracker keeps track of a current state of a transmission signal in a signal trellis or state machine that includes states and state transition logic. A bit-to-phase mapper is configured to map a first subset of the input bits to a set of state transition signals in accordance with a first mapping, and to map a second subset of input bits to the set of state transition signals in accordance with a second mapping that is inverted with respect to the first mapping. The selection of the first mapping and the second mapping is made based upon the current state of the transmission signal. The bit-to-phase mapper is configured to reduce, relative to a system that just uses the first bit mapping function, a measure of Hamming distance between merging trellis paths associated with merging events that have minimum Euclidian distance in a signal trellis associated with the transmission signal. A modulator is employed that uses the state transition signals to produce the transmission signal for being transmitted over a communication channel.

A second embodiment of the present invention involves a second communication transmitter apparatus. The transmitter receives an input bit sequence and uses a state tracker that similarly keeps track of a current state of a transmission signal. An input bit sequence preprocessor is employed that, during each of a plurality of signaling intervals, selectively inverts an input bit in accordance with the current state to produce a preprocessed bit sequence. A bit-to-phase mapper is configured to map a sequence of the bits of the preprocessed bit sequence to a sequence of state transition signals. A modulator then uses the state transition signals to produce the transmission signal for being transmitted over a communication channel. The selective inverting is performed to reduce, relative to a system that just uses the first bit mapping function, a measure of Hamming distance between merging trellis paths associated with merging events that have minimum Euclidian distance in a signal trellis associated with the transmission signal.

A third embodiment of the present invention involves a communication receiver apparatus. A channel interface is configured to receive a signal from a channel and to generate therefrom a baseband representation of the received signal. A metrics calculator is configured to compare, during a $k^{th}$ signaling interval, the baseband representation to a set of state transition signals in order to compute a set of metrics. A Viterbi decoder uses the computed metrics to determine a most probable path of states that were embedded into a transmission signal at a transmitter. The set of state transition signals includes a first subset of state transition signals that are generated according to a first bit mapping function and a second subset of state transition signals that are generated according to a second bit mapping function that is inverted relative to the first bit mapping function. The first and second subsets are assigned to states of a signal trellis to reduce, relative to a system that just uses the first bit mapping function, a measure of Hamming distance between merging trellis paths associated with merging events that have minimum Euclidian distance.

A fourth embodiment of the present invention involves a second communication receiver apparatus. A channel interface is configured to receive a signal from a channel and to generate therefrom a baseband representation of the received signal. A metrics calculator configured to compare, during a $k^{th}$ signaling interval, the baseband representation to a set of state transition signals in order to compute a set of metrics. A Viterbi decoder uses the computed metrics to determine a most probable path of states that were embedded into a transmission signal at a transmitter without knowledge of any state-dependent inverted bit mapping functions used to encode the transmission signal. A state tracker is used that keeps track of at least a current state that is a member of the most probable path of states produced by the Viterbi decoder. A bit post-processor is used that generates a sequence of output bits, $Ĭ_k$, by examining the recovered most probable path of the Viterbi decoder and an output bit sequence, $b_k$, produced by the Viterbi decoder. The bit post-processor selectively inverts a current bit if the most probable current state is a member of an identified subset of states whose output bit mapping is to be inverted. Most embodiments of this receiver are employed to reduce, relative to a system that just uses the first bit mapping function, a measure of Hamming distance between merging trellis paths associated with merging events that have minimum Euclidian distance.

BRIEF DESCRIPTION OF THE FIGURES

The various novel features of the present invention are illustrated in the figures listed below and described in the detailed description that follows.

DETAILED DESCRIPTION OF THE PREFERRED EMBODIMENTS

Figure 2:
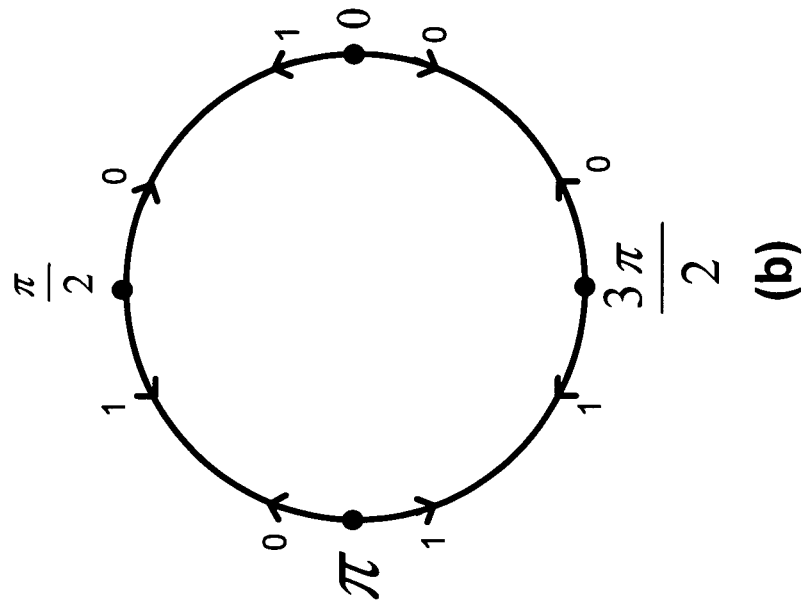
FIG. 2a illustrates a phase tree diagram for an improved MSK that uses the improved mapping policy of the present invention.
FIG. 2b illustrates a state transition diagram for the improved MSK that uses the improved mapping policy of the present invention.
Figure 2:
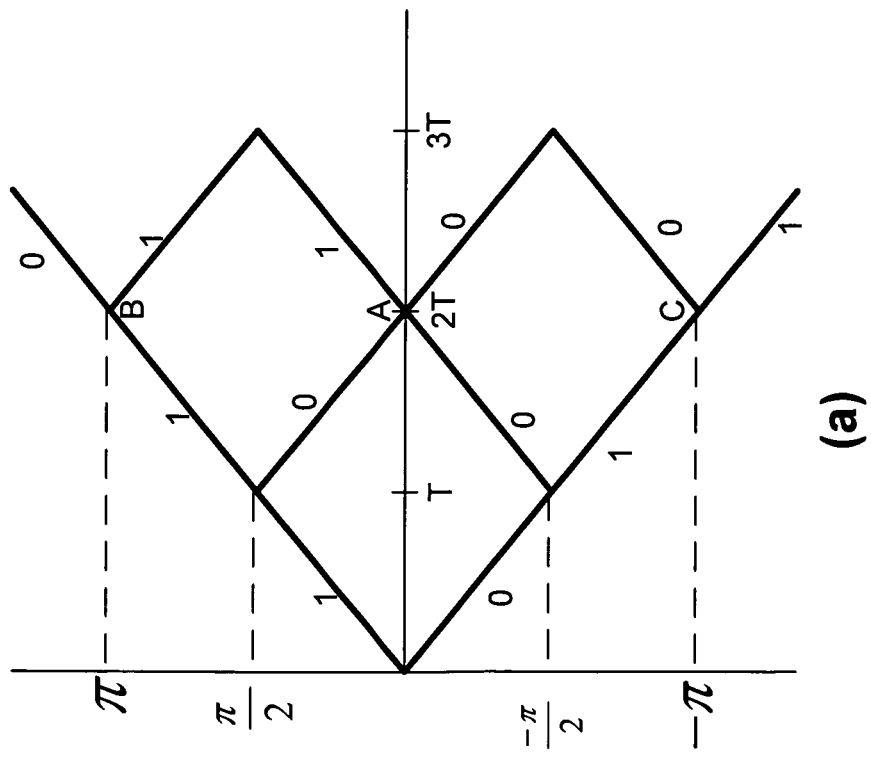

FIG. 2 illustrates an improved mapping policy for MSK signals designed in accordance with the present invention to reduce the conditional probability, $P_{B|E}$, and thus the number of bits in error whenever an error event occurs. As shown in FIG. 2a, when an error event does occur (merging event A or special merging event [B,C]), only the first bit out of the two bits in each merging event will be in error. This forces $P_{B|E}=½$, and thus $k_B=1$. The mapping policy of FIG. 2 effectively minimizes the Hamming distance between the paths of merging events with minimum distance.

As can be seen from FIGS. 2a and 2b, at phase states 0 and π/2, the improved MSK mapping policy employs the standard MSK mapping policy, i.e., it maps paths with positive slopes to bit 1 and paths with negative slopes to bit 0. At phase states π and 3π/2, an inverted mapping is used that maps the paths with positive slopes to bit 0 and paths with negative slopes to bits 1. Hence, in terms of MSK's two state structure, the mapping policy of FIG. 2 is phase-state dependent and alternates between standard and inverted mapping policies from one state to the next.

Figure 3:
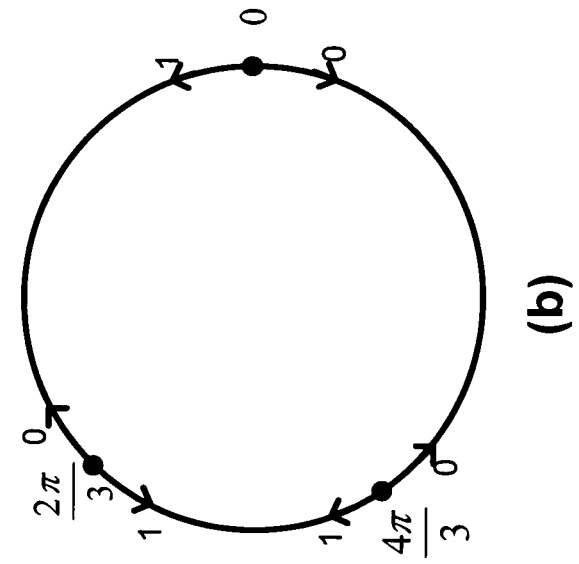
FIG. 3 illustrates performance curves that show the bit error rate variations of regular and improved MSK signals.
Figure 3:
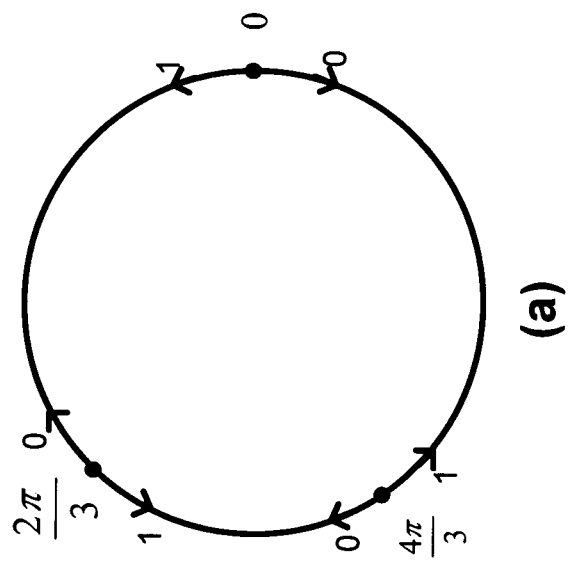

FIG. 3 shows the simulated bit error probability variations of regular and proposed MSK schemes along with their corresponding theoretical approximations given by (1). By viewing the horizontal difference between the curves of FIG. 3, it is seen that the mapping policy of FIG. 2 provides a significant improvement over the regular MSK, especially at lower SNR where the improvement is most needed.

It is known that CPFSK signals with modulation index h=p|q have 2q phase states when p is odd and q phase states when p is even. Hence, improved mapping policies can be readily derived for all CPFSK schemes when p is odd to reduce the value of $k_B$ in half. Specifically, if there are no special merging events, $k_B$ can be reduced from $k_B=1$ to $k_B=½$, and if there is a special merging event, $k_B$ can be reduced from $k_B=2$ to $k_B=1$.

Figure 4:
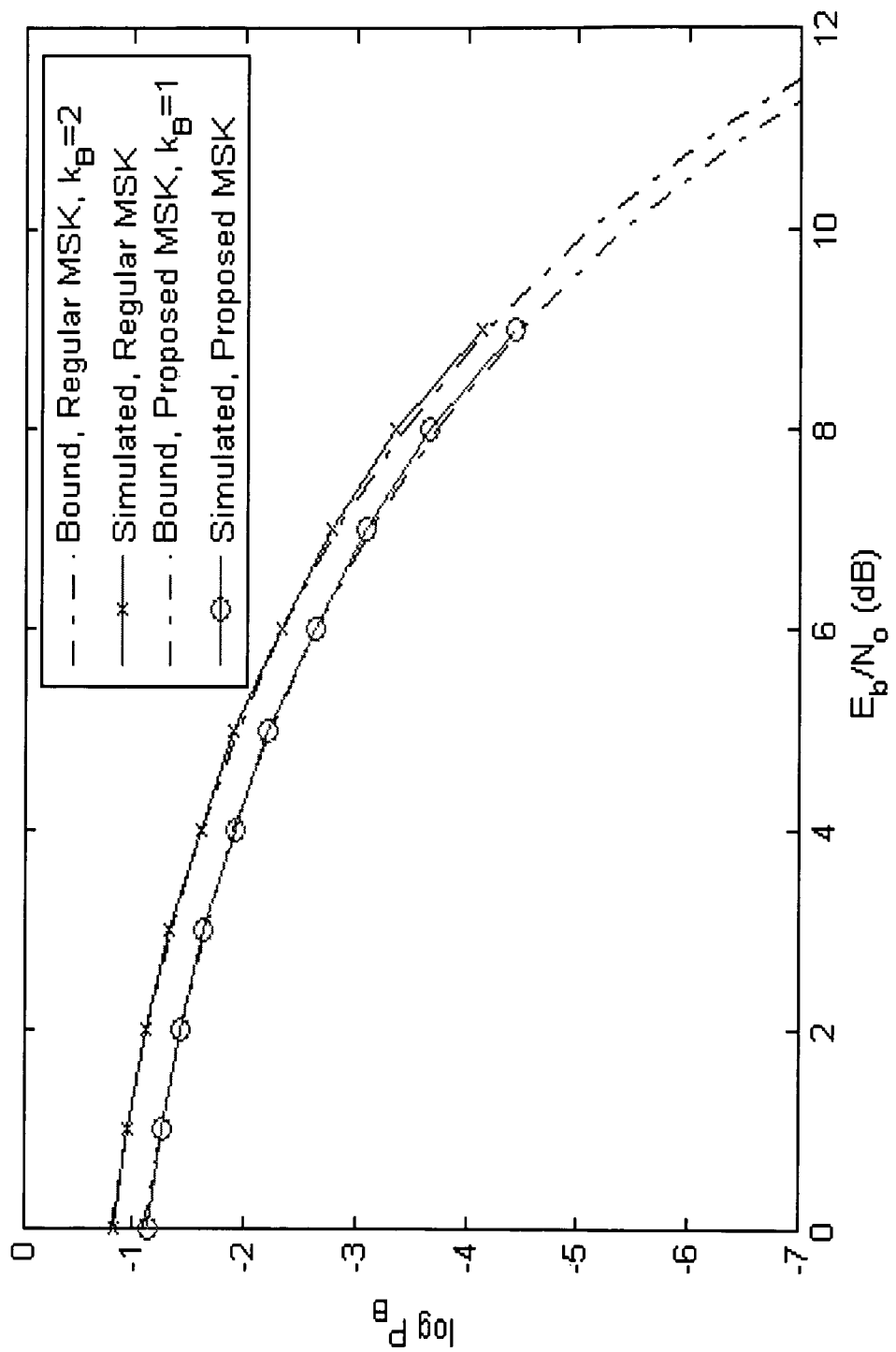
FIG. 4 provides phase state transition diagrams for CPFSK with h=⅔ using (a) Regular mapping Policy, (b) Improved Mapping Policy

When p is even, and q is odd, there will be no special merging events with minimum distance. In such cases, when the proposed mapping approach is applied, it will reduce the value of $k_B$ from $k_B=1$ to $k_B=(q+1)/(2q)$. For example, FIG. 4 illustrates the phase variations when the regular CPFSK bit mapping scheme and the proposed bit mapping schemes are applied to CPFSK with $h=\frac{2}{3}$. In FIG. 4b, it is seen that the merging-event paths with minimum distance that terminate at states 0 and $2\pi/3$ have only one out of two bits in error, while the merging events that terminate at state $4\pi/3$ have both bits in error, resulting in an average value of $k_B=\frac{2}{3}$ as opposed to $k_B=1$ in the regular mapping scheme of FIG. 4a. In general, we select an appropriate $StateSet_1$ of states where the bit mapping is not inverted and a $StateSet_2$ where the bit mapping is inverted, and the selection is made to minimize the Hamming distance between merging paths of merging events with minimum Euclidian distance.

Improved mapping policies can also be constructed for multi-amplitude CPFSK signals [2, 3]. Multi-amplitude CPFSK signals are formed by adding a number of CPFSK signals together. Hence, a composite mapping policy can be constructed for multi-amplitude CPFSK (MA-CPFSK) signals by applying the improved CPFSK mapping policy individually to each component CPFSK signal. Similar composite mapping policies can be constructed for quadrature multiplexed MSK (QM-MSK) signals and multi-amplitude QM-MSK signals [4].

Improved mapping policies can also be constructed for M-ary CPFSK signals [1-3]. In M-ary signaling, similar to FIG. 2a, the mapping policy is implemented by making sure, as much as possible, that the last symbol of the two paths of all merging events is the same. If this can be done for all merging events, such a mapping policy can reduce the error coefficient of an M-ary CPFSK symbol in half. If this can only be done for a selected number of merging events, $k_B$ can still be reduced, but not in half.

Next consider the mathematical structure of MSK and CPFSK signals. This will aid in the understanding of specific embodiments of exemplary transmitter and receiver structures implemented with the improved signal mapper of the present invention. A continuous phase modulation (CPM) baseband signal may be expressed as:

$$x(t)=Ae^{j\alpha(t)}, \quad (2)$$

where A is a constant amplitude, and $\alpha(t)$ is a phase function. Define an information sequence $I=(\ldots, I_{k-1}, I_k, I_{k+1}, \ldots)$; $I_k \in \{-1,+1\}$. Then the CPM phase function may be written as [1-3]:

$$\alpha(t) = 2\pi h \sum_{k=-\infty}^{\infty} I_k \int_{-\infty}^{t} g(\tau-kT)d\tau \quad (3)$$

where, h is a modulation index, T is a symbol duration, g(t) is a baseband frequency pulse-shape waveform. For example, for full response CPFSK signals the baseband pulse is a rectangular waveform, $g(t)=[u(t)-u(t-T)]$, that is nonzero only for $0 \leq t<T$. When the rectangular waveform $g(t)=[u(t)-u(t-T)]$, is used, the phase function of equation (3) can be written as:

$$\alpha(t) = \alpha_k + \pi h I_k \left(\frac{t-kT}{T}\right) \text{ for } kT \leq t < (k+1)T \quad (4)$$

where, $$\alpha_k = \pi h \sum_{i=-\infty}^{k-1} I_i$$

is the accumulated phase at the beginning of the $k^{th}$ symbol interval, and h and T are the same as in equation (3). The values $\alpha_k$ are known as "phase states" of the CPM signal. By equation (4), sequences of phase states are recursively related to the information sequence via $\alpha_{k+1}=\alpha_k+\pi h I_k$. Hence even without any trellis encoding, CPM signals have their own inherent memory structure which allows $I_k$ to be recovered by trellis decoding of the phase state sequence, $\{\alpha_k\}$.

The CPM transmission signal is given by (2) where the phase function is given by (3), and in the case of CPFSK, the phase function is given by (4). A modulator generates the transmission signal in most cases by phase modulating a carrier wave. However, any device that implements any of equations (2)-(4) can be considered to be a modulator.

In some cases, convolutional codes may be used. For example, in 4-ary CPFSK the information sequence, $I_k$, can be mapped to a coded sequence, $c_k$, using a rate-½ convolution encoder that maps according to $T_{code}:I \rightarrow C=(\ldots, c_{k-1}, c_k, c_{k+1}, \ldots)$, where $c_k \in \{-3, -1, +1, +3\}$. In such cases $$\alpha_k = \pi h \sum_{i=-\infty}^{k} c_k$$

is the accumulated phase at the beginning of the $k^{th}$ symbol interval. In the development below we consider the uncoded case, but realize that in general the bit stream may be coded. See reference [5] for further details.

In the uncoded case, at the end of the symbol interval, the phase will reach a value of $\alpha((k+1)T)=\alpha_{k+1}=\alpha_k+\Delta_k$, where $\Delta_k=\pi h I_k$. Here the value $\Delta_k$ may be viewed as a mapping that maps the $k^{th}$ input bit, $I_k$, onto a state transition out of the phase state $\alpha_k$. Substituting this definition of $\Delta_k$ into equation (4) we obtain an alternate form of the phase function:

$$\alpha(t) = \alpha_k + \Delta_k \frac{(t-kT)}{T} \text{ for } kT \leq t < (k+1)T, \quad (5)$$

and at the specific state transition times, kT, we can write a phase-state update equation as:

$$\alpha_{k+1}=\alpha_k+\Delta_k. \quad (6)$$

Note that the mapping, $\Delta_k=\pi h I_k$, causes equation (5) to represent a piece-wise linear phase function. The piece-wise linear segment during the $k^{th}$ interval is $\Delta_k(t-kT)/T$. At baseband, this phase transition, $\Delta_k(t-kT)/T$, is known as a state transition signal. Equation (6) can also be viewed as an example of a state tracking equation that can be used to keep track of a current state of the transmission signal.

In the case of MSK, we have $h=\frac{1}{2}$ and thus the mapping of the $k^{th}$ input bit, $I_k$, onto a state transition out of the $k^{th}$ phase state, $\alpha_k$, is given by $\Delta_k=\pi I_k/2$. This leads to the four phase-state system shown in FIGS. 1a and 1b. A Viterbi decoder as is well known in the art is used to recover the information sequence, $\{I_k\}$. The operation and construction of the Viterbi decoder to decode MSK signals is well known in the art and can be considered to be a well known block for the purposes of the present invention.

In regular MSK, the mapping, $\Delta_k$, maps the $k^{th}$ input bit to the state transition out of phase state, $\alpha_k$. This mapping can be written as:

$$\Delta_k = \pi I_k/2, \text{ for all states, } \alpha_k. \tag{7}$$

When MSK is used with the improved mapping function of FIG. 2, the mapping, $\Delta_k$, of the $k^{th}$ input bit to the $k^{th}$ state transition becomes state dependent. For example, the phase tree and phase state transition diagrams as illustrated in FIG. 2 can be seen to be governed by a state-dependent bit-to-phase mapping function given by:

$$\Delta_k = \begin{cases} \pi I_k/2 & \text{if } \alpha_k \in \{0, \pi/2\} \\ -\pi I_k/2 & \text{if } \alpha_k \in \{\pi, 3\pi/2\} \end{cases}, \tag{8}$$

where $\alpha_k$ is a current state tracked by a state tracker in the transmitter or a state tracker that keeps track of a recovered state sequence in a receiver. Equations (5)-(6), (8) define the state-dependent state transition signals used in the example of FIG. 2. More generally, a bit-to-phase mapper implements an improved bit-to-phase mapping function for the various CPFSK signals can be written in the form:

$$\Delta_k = \begin{cases} \pi I_k h & \text{if } \alpha_k \in \{StateSet_1\} \\ -\pi I_k h & \text{if } \alpha_k \in \{StateSet_2\} \end{cases}, \tag{9}$$

where in the case of MSK, $StateSet_1 = \{0, \pi/2\}$ and $StateSet_2 = \{\pi, 3\pi/2\}$. In other CPFSK schemes, the StateSets will be defined according to the phase tree structure of the given CPFSK being mapped with the improved signal mapper of the present invention. As previously discussed, the StateSets of equations (9) and (10) are determined to minimize the Hamming distance between merging paths that have minimum Euclidian distance for the particular signaling scheme under study.

Alternatively, one can generally define a bit transformation as follows:

$$b_k = \begin{cases} I_k & \text{if } \alpha_k \in \{StateSet_1\} \\ -I_k & \text{if } \alpha_k \in \{StateSet_2\} \end{cases}. \tag{10}$$

Figure 1:
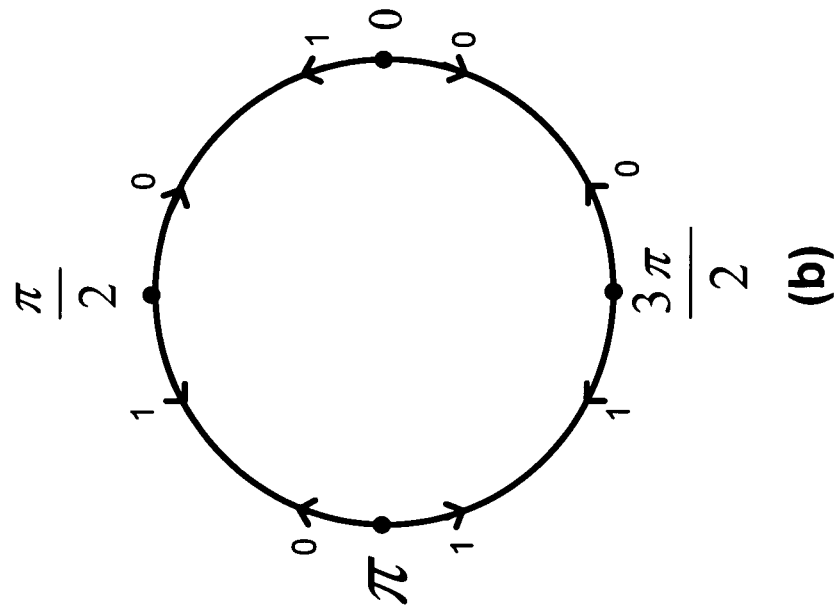
FIG. 1a illustrates a phase tree diagram for regular MSK that uses a prior art MSK mapping policy.
FIG. 1b illustrates a state transition diagram for regular MSK that uses a prior art MSK mapping policy.
Figure 1:
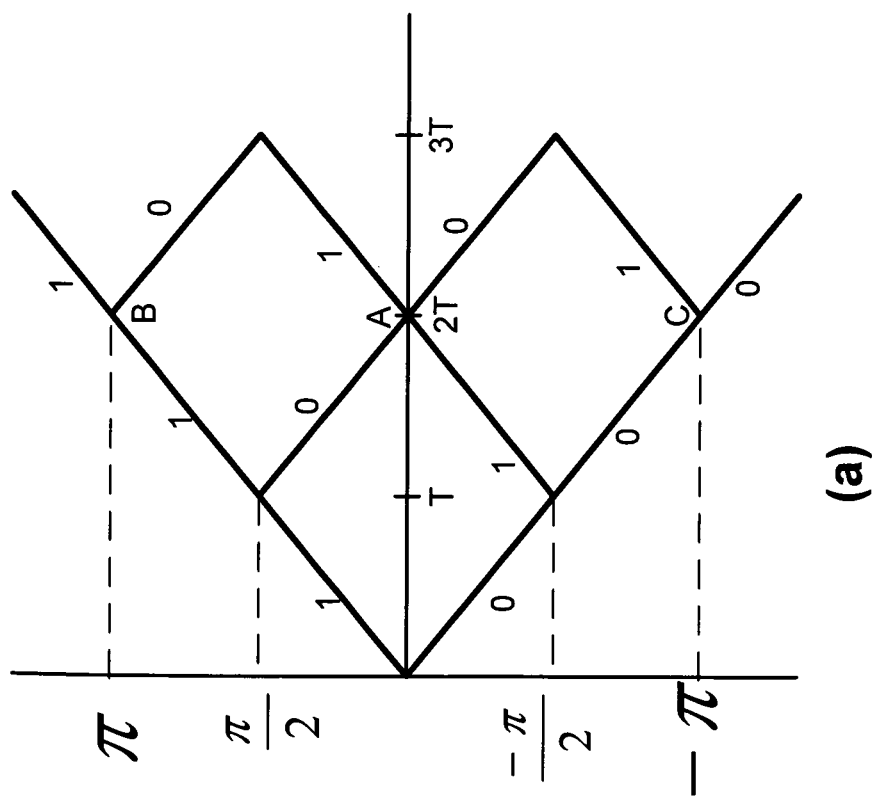

If the input bit sequence, $\{I_k\}$, is applied to a regular MSK transmitter, then the MSK of FIG. 1 will result, but if the transformed bit sequence, $\{b_k\}$, of equation (10) is applied to the same regular MSK transmitter, then the MSK with the improved signal mapping according to FIG. 2 will result.

Similarly, a regular Viterbi decoder that decodes regular MSK or CPFSK can be applied to a received version of a transmission signal of the form of FIG. 2 to recover the sequence $b_k$. The sequence $I_k$ can be recovered by keeping track of the current recovered state, $\alpha_k$, of the Viterbi decoder. Given knowledge of the current state, the output bit stream, $b_k$, of a regular MSK or CPFSK Viterbi decoder can be corrected by inverting selected output bits according to:

$$I_k = \begin{cases} b_k & \text{if } \alpha_k \in \{StateSet_1\} \\ -b_k & \text{if } \alpha_k \in \{StateSet_2\} \end{cases}. \tag{11}$$

For the specific case of MSK signaling, decoded bits, $b_k$ are inverted when the current recovered state, $\alpha_k$, is either $\pi$ or $3\pi/2$. That is, for MSK, $StateSet_2 = \{\pi, 3\pi/2\}$.

Figure 5:
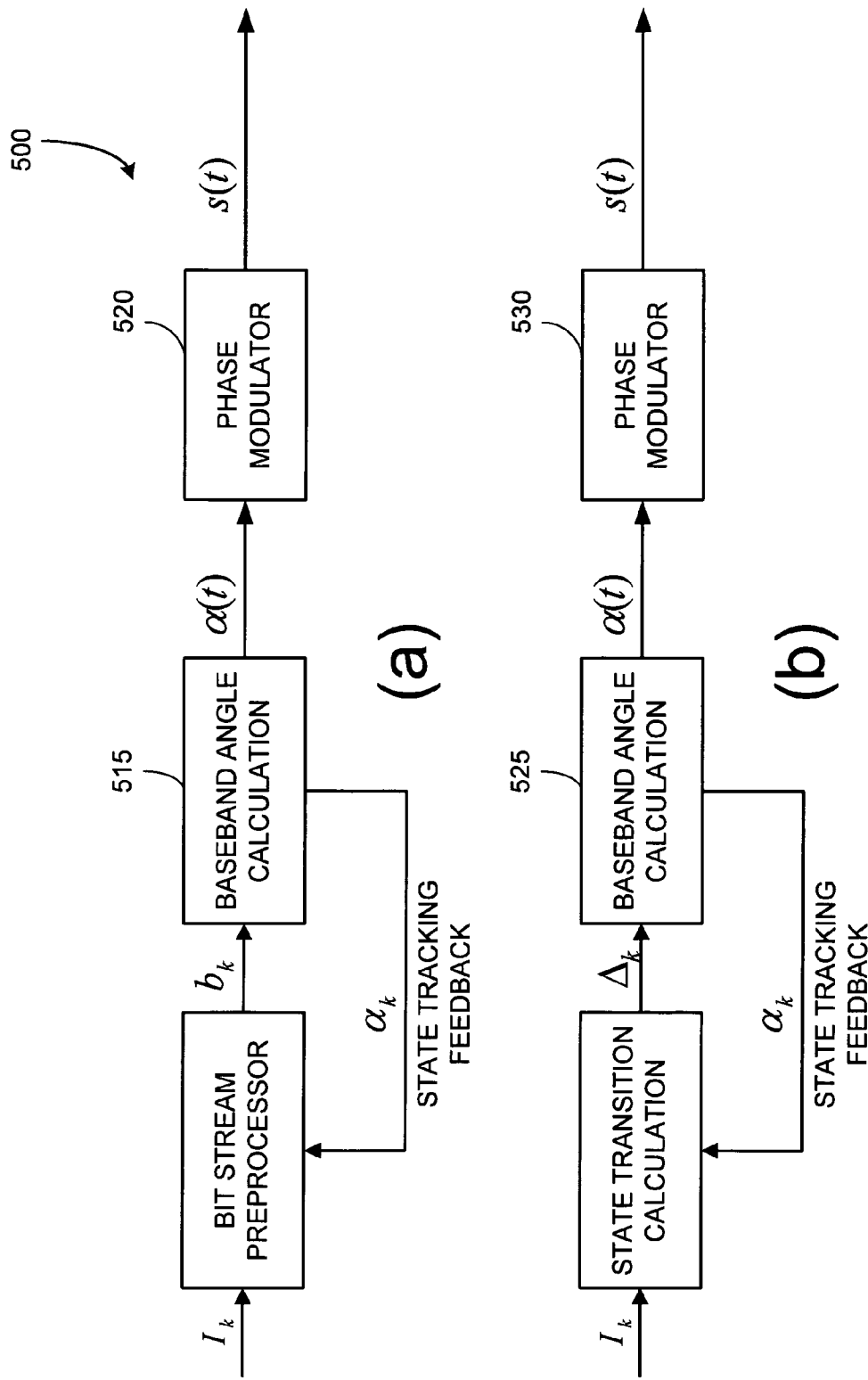
FIG. 5a illustrates a first embodiment of a transmitter that maps an input bit stream onto a modified bit stream state in accordance with a state tracker in order to produce a signal that implements the improved signal mapping policy of the present invention using a standard prior art signal encoder.
FIG. 5b illustrates a second embodiment of a transmitter that maps an input bit stream onto a modified state sequence in accordance with a state tracker in order to produce a signal that implements the improved signal mapping policy of the present invention.

CPFSK transmitters can be constructed in accordance with FIG. 5. FIG. 5a, shows a configuration where a bit stream preprocessor implements equation (10) with the benefit of the phase state sequence $\alpha_k$ being fed back from an angle calculation module that implements any or all of equations (2)-(5) and uses the standard mapping of input bits onto phase transitions, such as equation (7) for the case of MSK or more generally $\Delta_k = \pi h I_k$, for CPFSK signaling. A state tracker is employed, generally as a part of the angle calculation module to track state information, e.g., according to equation (6) and using a fixed (state independent) bit mapping, for example, of the from, $\Delta_k = \pi h I_k$. The tracked state information is then fed back to the preprocessor to help in computing equation (10).

The alternative structure of FIG. 5b implements equation (9) instead of equation (10). That is, the encoder computes the state transitions, $\Delta_k$, of equation (9) (or specifically equation (8) for the case of the improved MSK mapping of FIG. 2). These state transitions are then used by a state tracker in the angle calculation module to compute the next phase states, $\alpha_{k+1}$, of equation (6) and the phase function, $\alpha(t)$ of equations (2)-(5).

Figure 6:
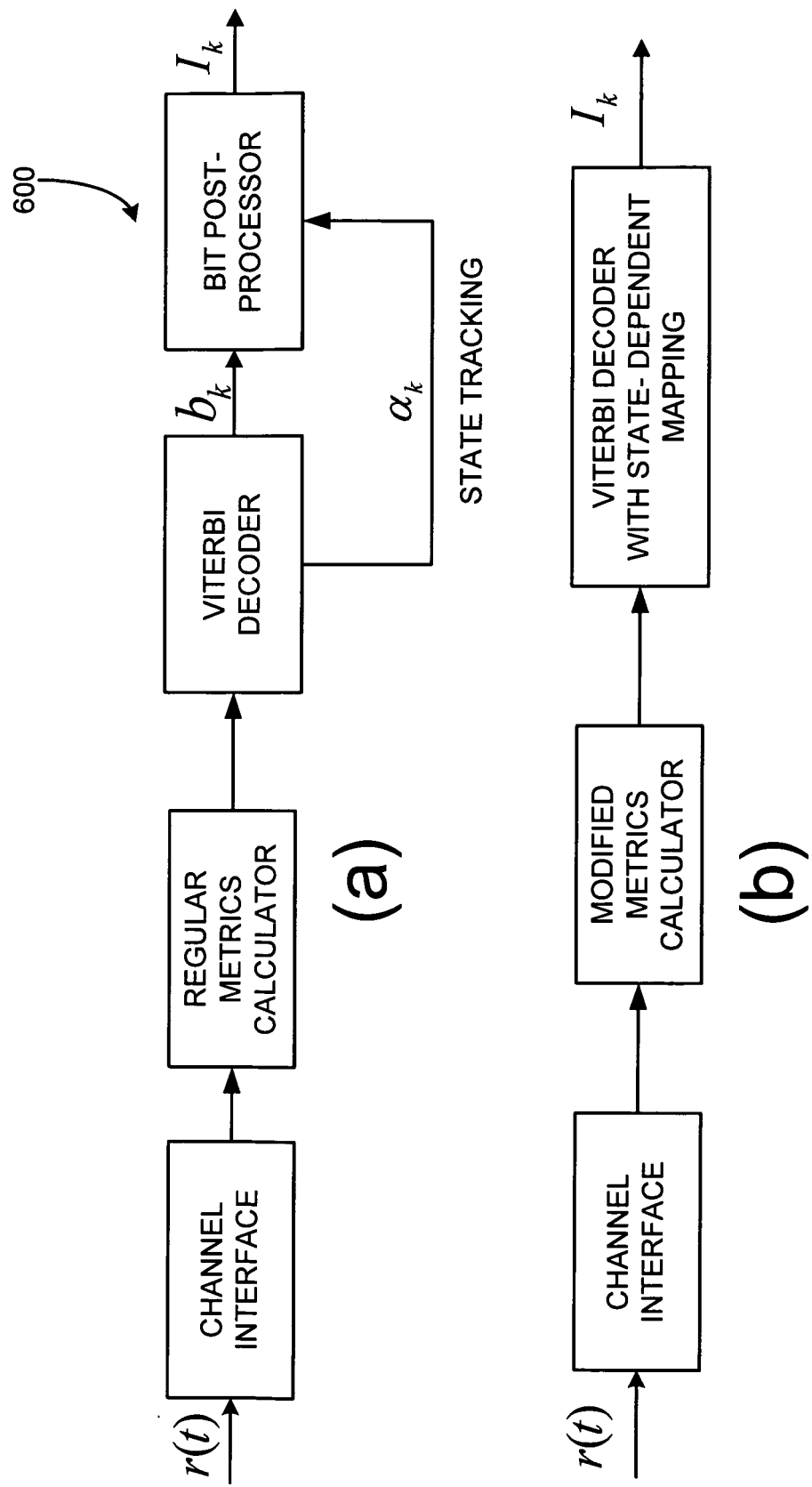
FIG. 6A illustrates a first embodiment of a receiver that uses a regular Viterbi decoder to decode the received signal, and then uses a bit postprocessor with a state tracker to produce a corrected output bit stream.
FIG. 6B illustrates a first embodiment of a receiver that uses customized Viterbi decoder that uses modified metrics calculations to decode the received signal and to produce an output bit stream directly.

FIG. 6 illustrates alternative receiver structures for MSK or CPFSK signals. As shown in FIGS. 6a and 6b, a received signal, r(t), is first processed through a channel interface. The channel interface may include demodulation from a passband frequency, timing recovery, analog to digital conversion, and the like. The output of the channel interface is then sent to a metrics calculator unit. The metrics calculator unit correlates the received signal, r(t), to a set of template signals that each correspond to different possible state transitions of the form of equation (5). That is, the channel interface provides a noisy (and possibly digitized) estimate of $\alpha(t)$ for each interval $kT \leq t < (k+1)T$, and these estimates are correlated with each possible phase transition from each phase state as per equation (5). These correlation values are known as branch metrics and are used by the well known Viterbi decoder blocks in FIG. 6. For further information on Viterbi decoding, see published application US 2007/0092018A1, which is incorporated herein by reference. See especially FIGS. 4-5 therein and the description thereof for an exemplary discussion of how Viterbi decoding is performed.

In FIG. 6a, for the exemplary case of MSK, a regular prior art Viterbi decoder that is designed to decode the signals of FIG. 1 is used to decode a received signal that was encoded in accordance with FIG. 2. Due to a lack of inversions of the template state transition signals (see equations (4)-(7)) used in the Regular Metric Calculation block, the Viterbi decoder produces the output bit stream, $b_k$, as defined in equation (10). In the receiver, a state tracker keeps track of the most probable sequence of states produced by the Viterbi decoder. This state tracker can be viewed as a portion of the Viterbi decoder itself. By providing the Viterbi decoder's recovered state sequence as an output, a state-dependent bit post-processor implements equation (11) using the tracked state information to convert the sequence, $b_k$, back to an estimate of the input stream $\breve{I}_k$.

FIG. 6b uses a customized Viterbi decoder whose metrics calculator is modified to use the mapping functions (8) instead of (7). More generally, for CPFSK, instead of using the mapping function, $\Delta_k = \pi h I_k$, the mapping function of equation (9) is used. When the metrics calculation unit is modified in this manner, no output post-processing is needed. As can be seen, the state structure of FIG. 6a and FIG. 6b stays the same, the only difference in the encoding and decoding process concerns the mapping of bits to state transitions. The embodiments of FIGS. 6a and 6b are mathematically equivalent.

Figure 7:
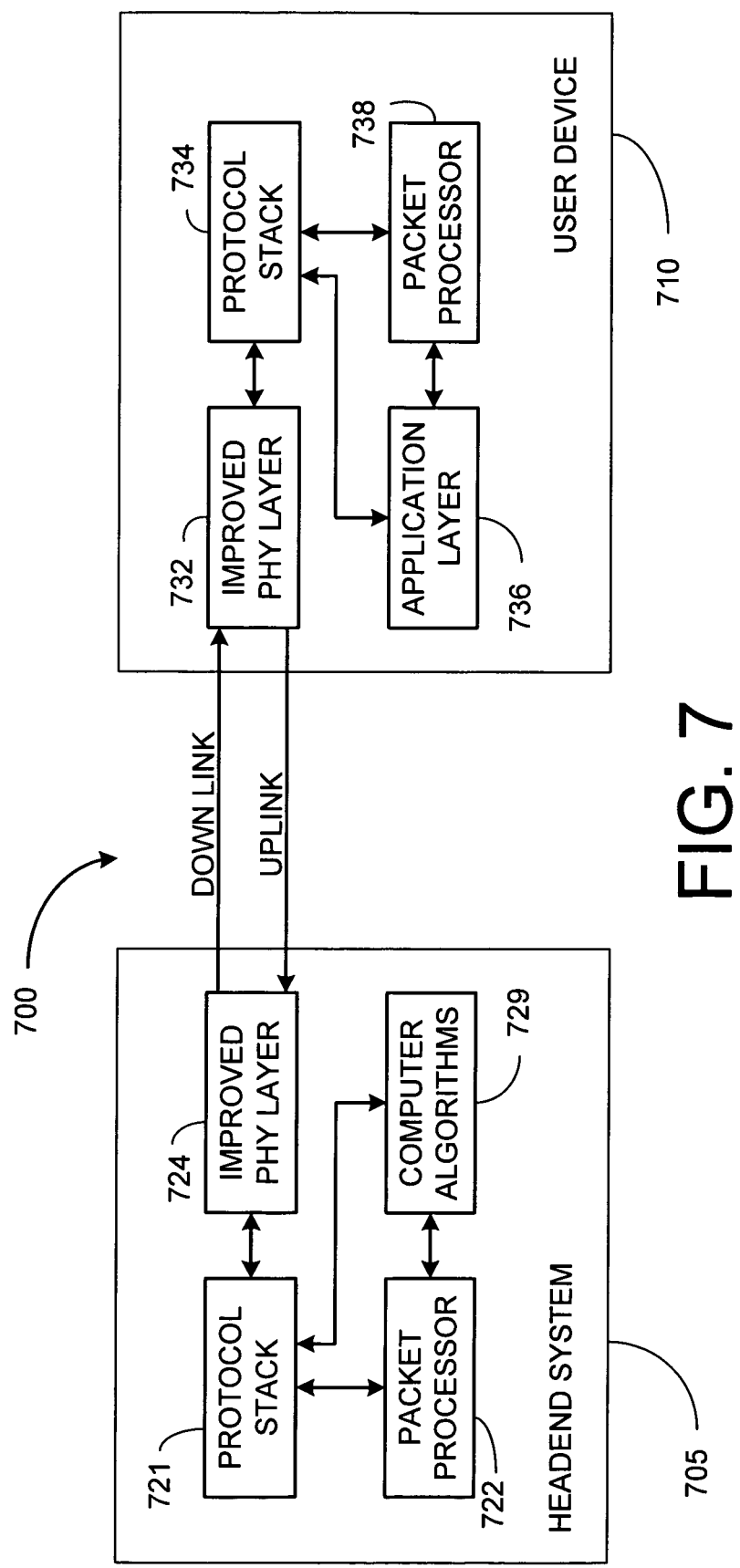
FIG. 7 is a block diagram representing an exemplary uplink/downlink type communication system used to implement a communication system and/or a communication protocol to provide a layered protocol structure using the improved mapping techniques of the present invention in the physical layer.

FIG. 7 shows a typical system that makes use of the present invention. A transmitter 705 transmits to a receiver 710. In some embodiments the transmitter 705 is a head end system and the receiver 710 is a user device, although peer-to-peer systems are also possible. An improved transmitter 724 uses an embodiment such as those illustrated in FIG. 5a or 5b or their equivalents. An improved receiver 732 uses an embodiment such as those illustrated in FIG. 6a or 6b or their equivalents. As shown in the figure, application software and network devices and software are preferably integrated into the communication systems components 705 and 710 of the system 700. The system 700 can include cable modem systems, DSL modem based systems, wireless systems, satellite systems, and the like. All such systems fall under the scope of the present invention when the inventive physical layer is used.

Although the present invention has been described with reference to specific embodiments, other embodiments may occur to those skilled in the art without deviating from the intended scope. It should be recognized that the above described inventions can be applied to other types of coded or uncoded modulation that have inherent memory. This includes linear modulation signals with memory, other types of continuous phase modulated (CPM) signals beyond CPFSK, CPM signals with non-square pulse shapes, and the like. In all of the above-mentioned signaling schemes with memory, the present invention can be applied similarly by using a state-dependent signal mapping scheme selected to minimize the Hamming distance between merging paths of minimum-distance merging events. Likewise, in any such modulation scheme, receiver structure can be constructed using a Viterbi decoder and either of the mathematically equivalent decoder structures of FIG. 6a or 6b. Hence it should be understood that FIGS. 5a, 5b, 6a, and 6b can all be applied more generally to CPM signals and other types of signals with memory.

In the examples of FIGS. 1-2, the minimum distance merging events occur after two symbol intervals. When the merging event occurs after two intervals the best we can do is to reduce the number of bit errors to one. In the example of FIG. 2, this is performed by alternating between standard and inverted two bit mapping functions as a function of state. For example, in FIG. 2, at phase states 0 and $\pi/2$, the standard MSK bit mapping function is used, while at states $\pi$ and $3\pi/2$, the inverted bitmapping function is used. Note though, that in the mapping scheme of FIG. 2, the state dependent bit mappings are fixed at each state and are independent of the interval. As discussed below, the state-dependent bit mapping functions can further be made dependent on both the state and on the interval. They can be made to vary periodically as a function of the symbol interval.

In some systems, for example, when trellis coded modulation is used (such as in [5]), the minimum distance merging event can occur after more than two symbol intervals. With prior art bit mapping, such merging events can have two or more bit errors associated with them. However, the signal mapping techniques of the present invention can be extended to reduce the number of bit errors that occur in case of such error events by making the bit mapping policies dependent on the states, intervals or both on the states and intervals. Allowing the bit mapping policies to depend both on the states and on the intervals provides further flexibility to reduce the Hamming distance between the paths of different merging events that have minimum distance. In some embodiments the period of changing the mapping functions at all or at selected states could be more than two intervals, e.g., the period could be three or more intervals, e.g.: Standard, Standard, Inverted, Standard, Standard Inverted . . . .

While the previous examples assume a rectangular baseband frequency pulse to generate CPFSK signals [1-3], the improved mapping policies can be constructed for a general class of continuous phase modulation (CPM) signals that employ different baseband pulses [1-3], and to other forms of CPM signals including trellis coded and multi-h signals. Trellis coded and multi-h based schemes usually have minimum distance merging events longer than two intervals. In general improved mapping policies can be constructed for such schemes by simply changing the mapping of symbols onto the existing paths to ensure the same symbol is mapped to all terminating branches that merge into a given state. These common symbols vary from state to state and the symbol at any state can be chosen depending on the scheme to minimize the Hamming distance between the paths of merging events with minimum Euclidean distance. The proposed method can be used to reduce the value of $k_B$ in any such scheme by an amount that depends on the specific scheme. Therefore, it is to be understood that the invention herein encompasses all such embodiments that do not depart from the spirit and scope of the invention as defined in the appended claims.

What we claim is:

1. A transmitter apparatus, comprising:
    an input coupled to receive an input bit sequence that comprises input bits;
    a state tracker that keeps track of a current state of a transmission signal;
    a bit-to-phase mapper configured to map a first subset of the input bits to a set of state transition signals in accordance with a first mapping, and to map a second subset of input bits to the set of state transition signals in accordance with a second mapping that is inverted with respect to the first mapping, wherein the selection of the first mapping and the second mapping is made based upon the current state of the transmission signal, and the bit-to-phase mapper is further configured to reduce, relative to a system that just uses the first bit mapping function, a measure of Hamming distance between merging trellis paths associated with merging events that have minimum Euclidian distance in a signal trellis associated with the transmission signal; and
    a modulator that uses the state transition signals to produce the transmission signal for being transmitted over a communication channel;
    wherein the transmitter apparatus provides a physical layer interface to the communication channel and the transmitter apparatus provides a coupling of the transmission signal onto the communication channel for communication with a remotely located communications device.

2. The transmitter apparatus of claim 1, wherein the current state is a phase state associated with a continuous phase frequency shift keyed (CPFSK) signal.

3. The transmitter apparatus of claim 1, wherein the current state is a phase state associated with a continuous phase modulation (CPM) signal.

4. The transmitter apparatus of claim 1, wherein the current state is a phase state associated with a minimum shift keyed (MSK) signal.

5. The transmitter apparatus of claim 4, wherein the bit-to-phase mapper maps a bit of input bit sequence to a state transition signal of the corresponding first subset of the state transition signals in accordance with a first mapping when the current state is either 0 or $\pi/2$, and maps a bit of the input sequence to a state transition signal of the corresponding second subset of the state transition signals in accordance with the second mapping when the current state is either $\pi$ or $3\pi/2$.

6. The transmitter apparatus of claim 1, wherein the selection of the first mapping and the second mapping is further made based upon the current symbol interval of the transmission signal.

7. The transmitter apparatus of claim 6, wherein the selection of the first mapping and the second mapping at a particular state is periodically altered as a function of the current symbol interval of the transmission signal.

8. The receiver apparatus of claim 1, wherein the transmitter apparatus is implemented as at least a portion of a physical layer of a communications protocol stack in a member of the group consisting of a headend system and a user device.

9. A transmitter apparatus, comprising:
an input coupled to receive an input bit sequence;
a state tracker that keeps track of a current state of a transmission signal;
an input bit sequence preprocessor that, during each of a plurality of signaling intervals, selectively inverts an input bit in accordance with the current state to produce a preprocessed bit sequence;
a bit-to-phase mapper configured to map a sequence of bits of the preprocessed bit sequence to a sequence of state transition signals; and
a modulator that uses the state transition signals to produce the transmission signal for being transmitted over a communication channel;
wherein the selective inverting is performed to reduce, relative to a system that just uses the first bit mapping function, a measure of Hamming distance between merging trellis paths associated with merging events that have minimum Euclidian distance in a signal trellis associated with the transmission signal;
wherein the transmitter apparatus provides a physical layer interface to the communication channel and the transmitter apparatus provides a coupling of the transmission signal onto the communication channel for communication with a remotely located communications device.

10. The transmitter apparatus of claim 9, wherein the current state is a phase state associated with a continuous phase frequency shift keyed (CPFSK) signal.

11. The transmitter apparatus of claim 9, wherein the current state is a phase state associated with a continuous phase modulation (CPM) signal.

12. The transmitter apparatus of claim 9, wherein the current state is a phase state associated with a minimum shift keyed (MSK) signal.

13. The transmitter apparatus of claim 12, wherein the input bit sequence preprocessor passes a bit of the first subset of input bits unchanged when the current state is either 0 or $\pi/2$, and the input bit sequence preprocessor inverts a bit of the second subset of input bits when the current state is either $\pi$ or $3\pi/2$.

14. The transmitter apparatus of claim 9, wherein the input bit sequence preprocessor further selectively inverts the input bit in accordance with the current symbol interval of the transmission signal.

15. The transmitter apparatus of claim 14, wherein the way that the input bit sequence preprocessor selectively inverts the input bit in accordance with the current symbol interval is periodically altered as a function of the symbol interval of the transmission signal.

16. The receiver apparatus of claim 9, wherein the transmitter apparatus is implemented as at least a portion of a physical layer of a communications protocol stack in a member of the group consisting of a headend system and a user device.

17. A receiver apparatus, comprising:
a channel interface configured to receive a signal from an external communication channel and to generate therefrom a baseband representation of the received signal;
a metrics calculator configured to compare, during a $k^{th}$ signaling interval, the baseband representation to a set of state transition signals in order to compute a set of metrics;
a Viterbi decoder that uses the computed metrics to determine a most probable path of states that were embedded into a transmission signal at a transmitter;
wherein the set of state transition signals includes a first subset of state transition signals that are generated according to a first bit mapping function and a second subset of state transition signals that are generated according to a second bit mapping function that is inverted relative to the first bit mapping function, and the first and second subsets are assigned to states of a signal trellis to reduce, relative to a system that just uses the first bit mapping function, a measure of Hamming distance between merging trellis paths associated with merging events that have minimum Euclidian distance.

18. A receiver apparatus, comprising:
a channel interface configured to receive a signal from an external communication channel and to generate therefrom a baseband representation of the received signal;
a metrics calculator configured to compare, during a $k^{th}$ signaling interval, the baseband representation to a set of state transition signals in order to compute a set of metrics;
a Viterbi decoder that uses the computed metrics to determine a most probable path of states that were embedded into a transmission signal at a transmitter without knowledge of any state-dependent inverted bit mapping functions used to encode the transmission signal;
a state tracker that keeps track of at least a current state that is a member of the most probable path of states produced by the Viterbi decoder; and
a bit post-processor that generates a sequence of output bits, $\check{I}_k$, by examining the recovered most probable path of the Viterbi decoder and an output bit sequence, $b_k$, produced by the Viterbi decoder, and wherein the bit post-processor selectively inverts a current bit if the most probable current state is a member of an identified subset of states whose output bit mapping is to be inverted.

19. The receiver apparatus of claim 18, wherein the bit post processor is employed to reduce, relative to a system that does not use state dependent bit inversion, a measure of Hamming distance between merging trellis paths associated with merging events that have minimum Euclidian distance.

20. The receiver apparatus of claim 18, wherein the receiver apparatus is implemented as at least a portion of a physical layer of a communications protocol stack in a member of the group consisting of a headend system and a user device.

* * * * *